(12) United States Patent
Motojima

(10) Patent No.: US 7,131,853 B2
(45) Date of Patent: Nov. 7, 2006

(54) CARD CONNECTOR

(75) Inventor: Joe Motojima, Tokyo (JP)

(73) Assignee: Japan Aviation Elecfronics Industry, Limited, Tokyo (JP)

( * ) Notice: Subject to any disclaimer, the term of this patent is extended or adjusted under 35 U.S.C. 154(b) by 0 days.

(21) Appl. No.: 11/121,716

(22) Filed: May 3, 2005

(65) Prior Publication Data

US 2006/0003617 A1    Jan. 5, 2006

(51) Int. Cl.
H01R 13/62      (2006.01)

(52) U.S. Cl. .................................. 439/159; 439/630

(58) Field of Classification Search .............. 439/159, 439/630, 361, 325, 328, 260, 259
See application file for complete search history.

(56) References Cited

U.S. PATENT DOCUMENTS 6,398,567 B1 *   6/2002   Nishimura ................. 439/159
6,776,640 B1 *   8/2004   Nishioka .................... 439/325

FOREIGN PATENT DOCUMENTS

JP      11-149956 A      6/1999
JP      2001-267013 A    9/2001

* cited by examiner

*Primary Examiner*—Alexander Gilman
(74) *Attorney, Agent, or Firm*—Frishauf, Holtz, Goodman & Chick, P.C.

(57) ABSTRACT

A card connector has an ejecting mechanism and a locking mechanism. The ejecting mechanism has an ejecting slider slidable together with a card in card inserting and ejecting directions. The ejecting slider has an operating part. The locking mechanism has an operated part elastically deformable and a locking portion combined with the operated part. The locking portion is movable between an open position and a closed position of a card inserting/ejecting opening. When the card is inserted, the ejecting slider slides in the inserting direction to separate the operating part from the operated part so that the operated part is deformed in one direction to move the locking portion from the open position to the closed position.

4 Claims, 13 Drawing Sheets

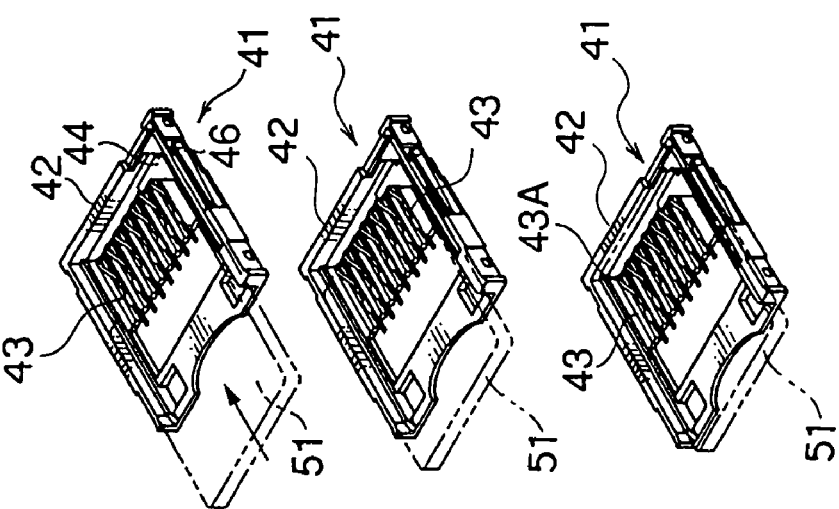
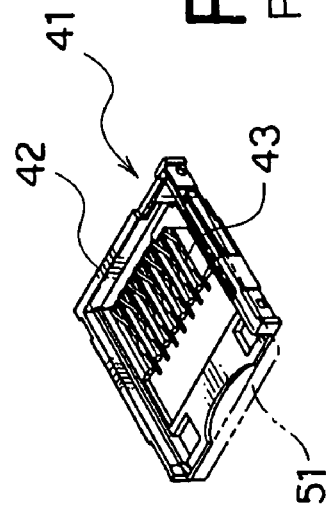
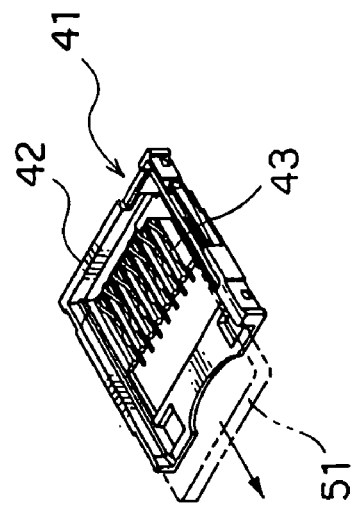
FIG. 3A PRIOR ART
FIG. 3B PRIOR ART
FIG. 3C PRIOR ART
FIG. 3D PRIOR ART
FIG. 3E PRIOR ART

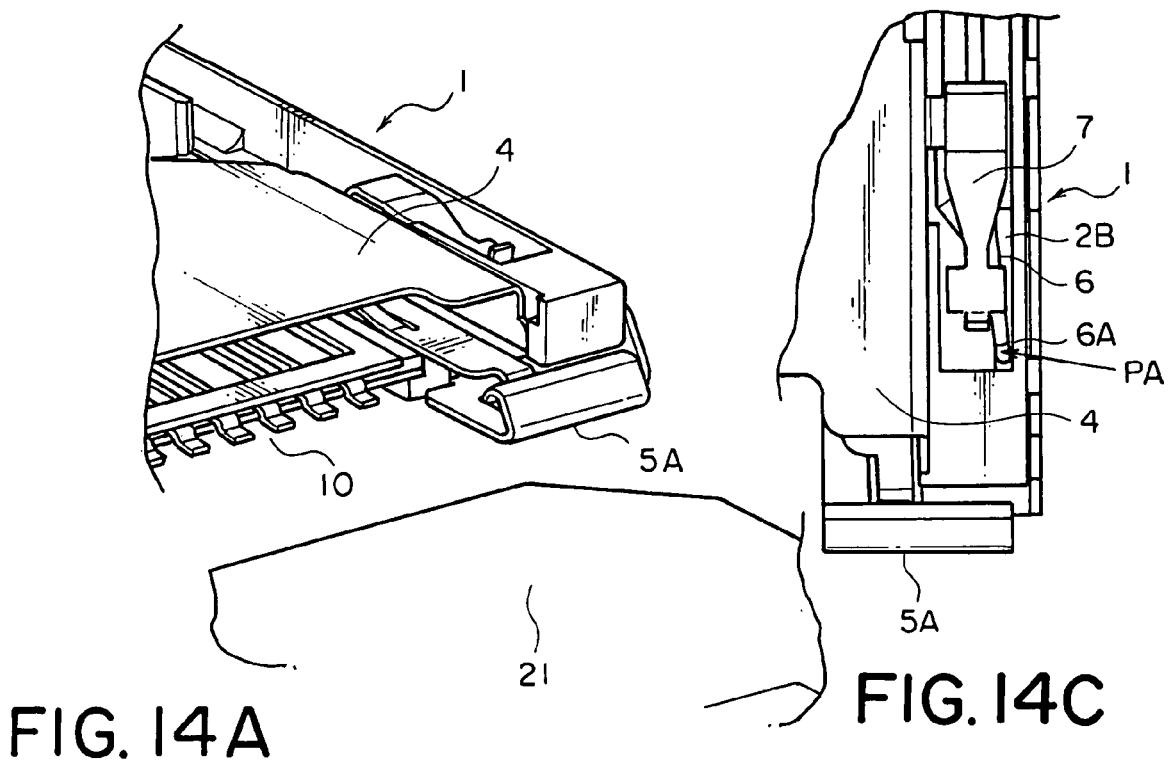
FIG. 14A
FIG. 14C
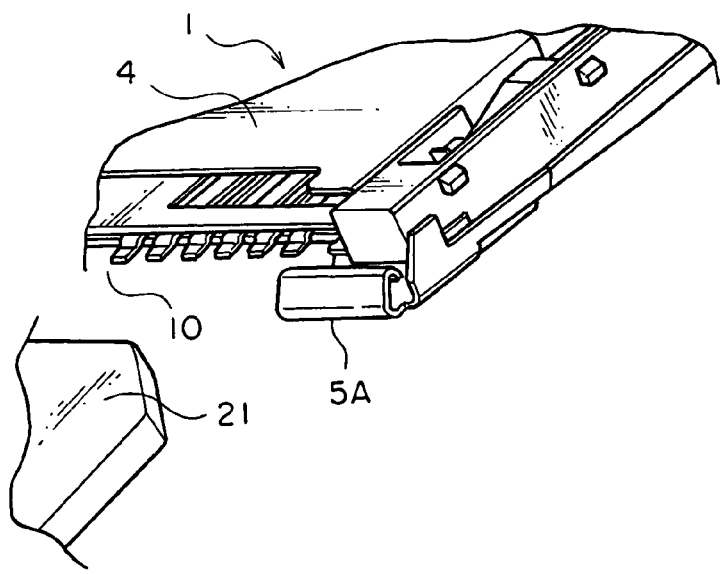
FIG. 14B

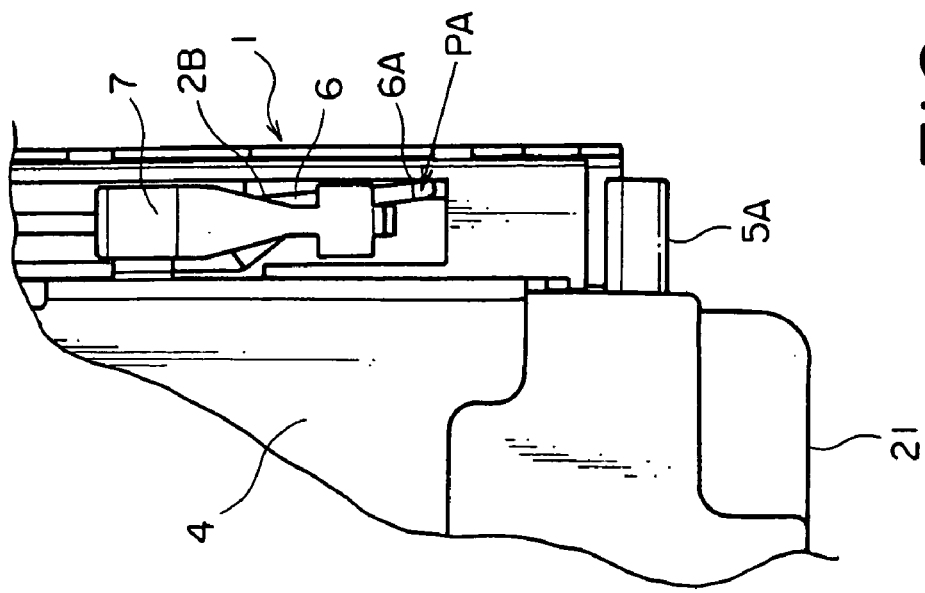
FIG.15C
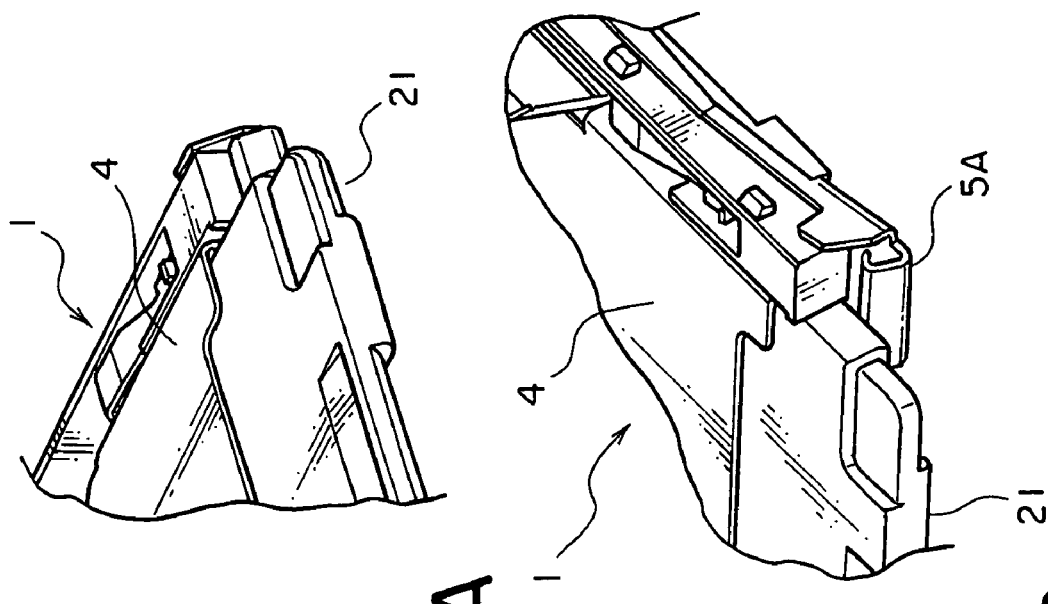
FIG.15A
FIG.15B

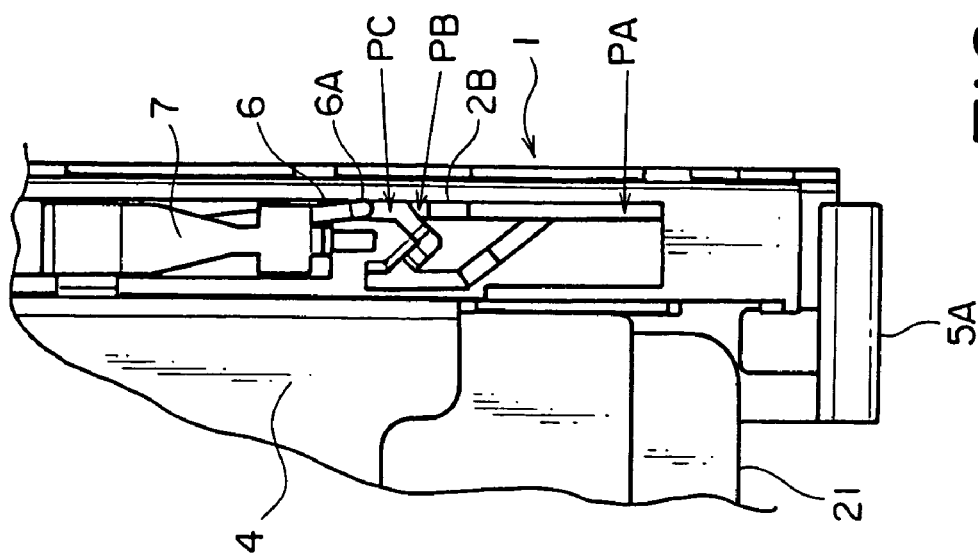
FIG. 16C
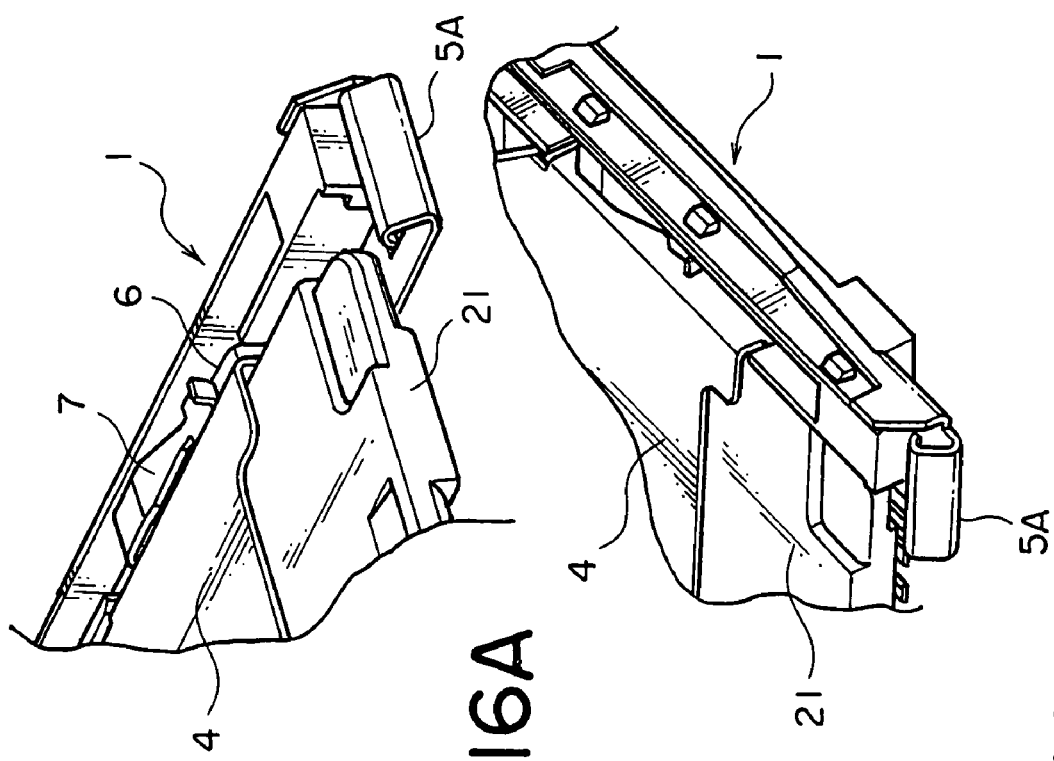
FIG. 16A
FIG. 16B

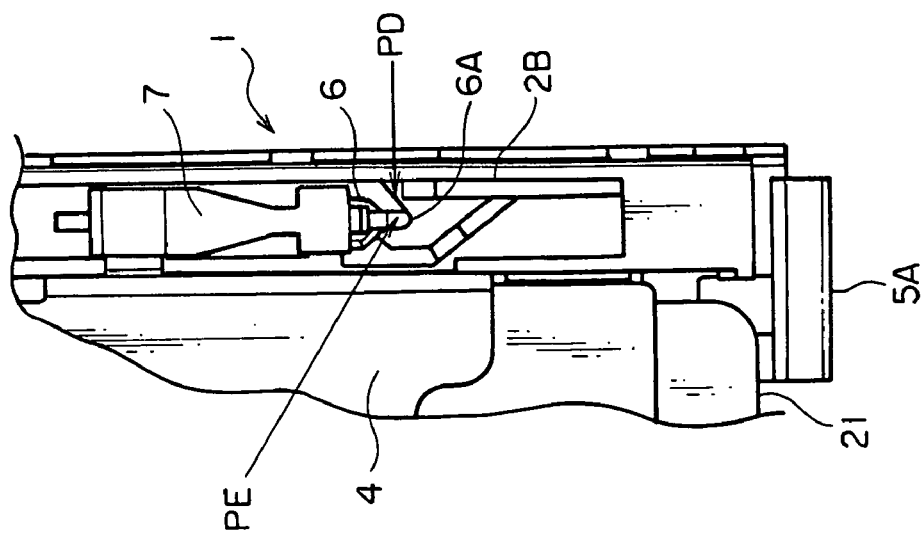
FIG. 17C
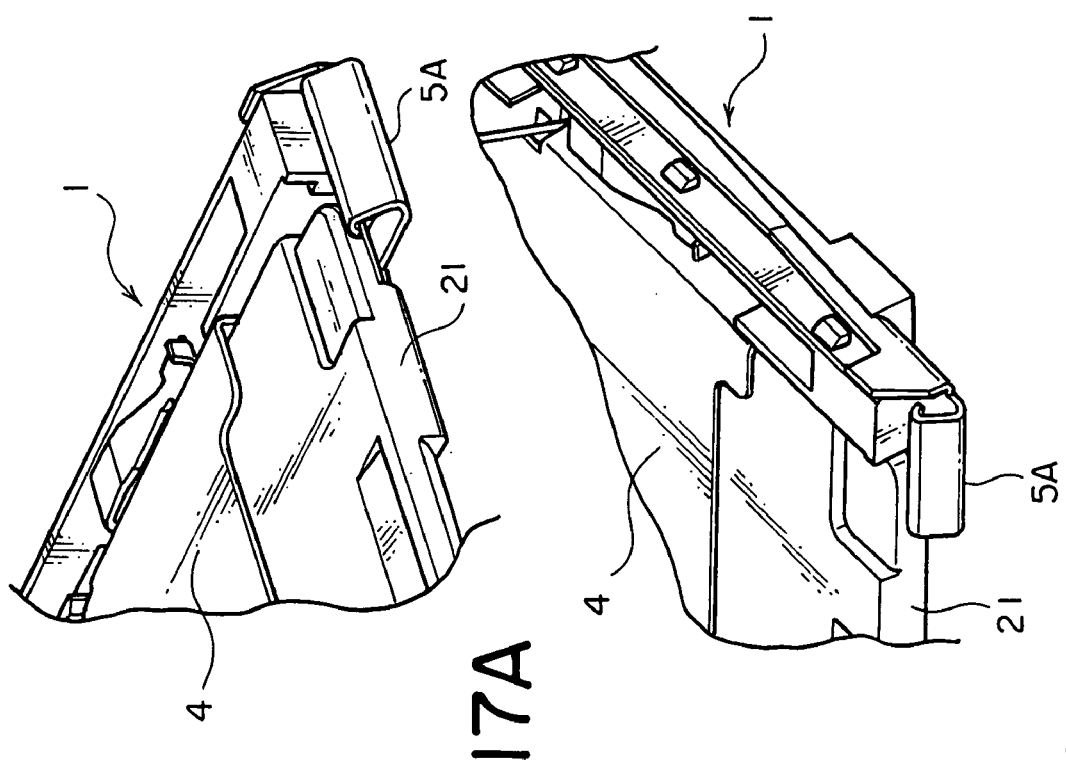
FIG. 17A
FIG. 17B

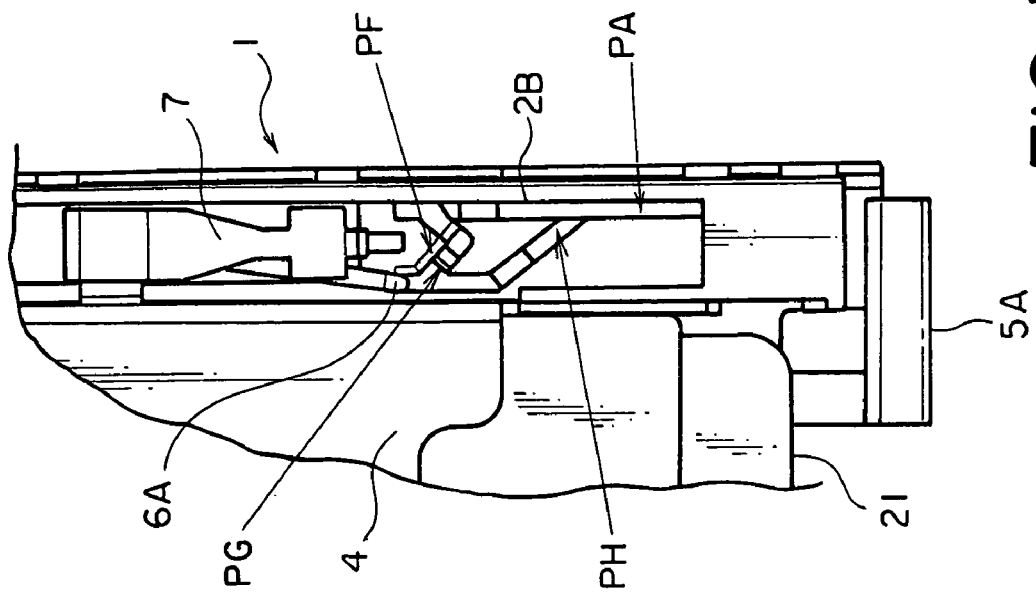
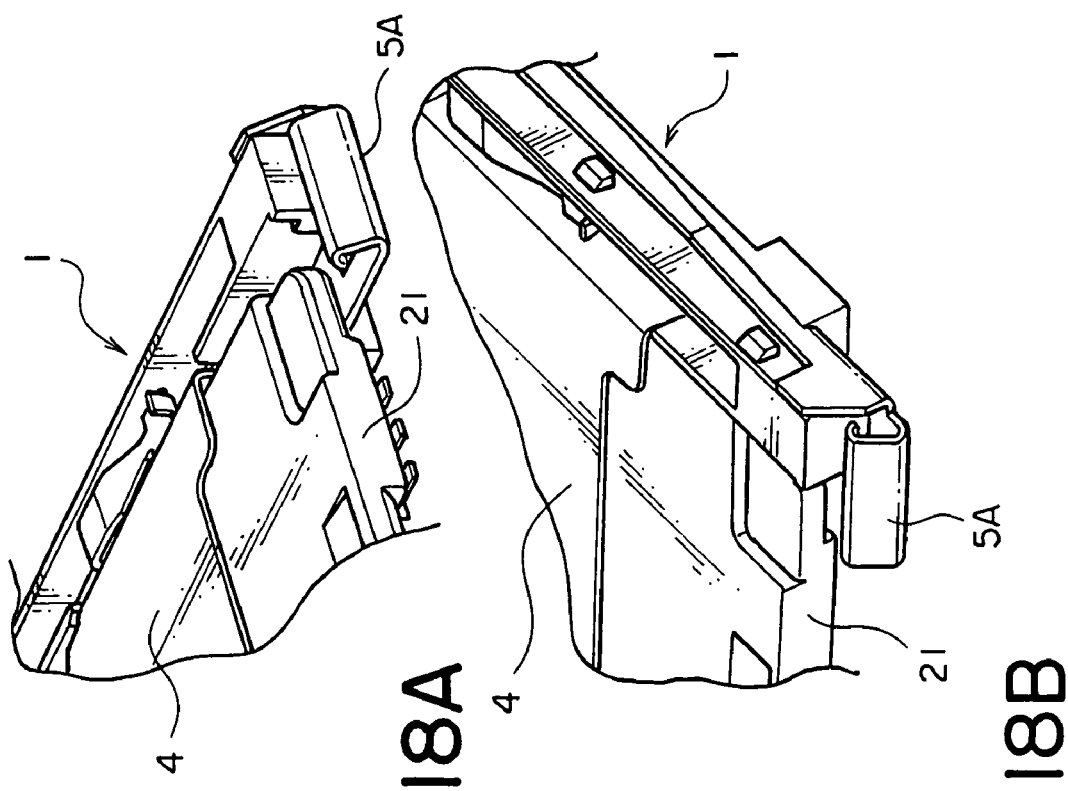
FIG.18A
FIG.18B
FIG.18C

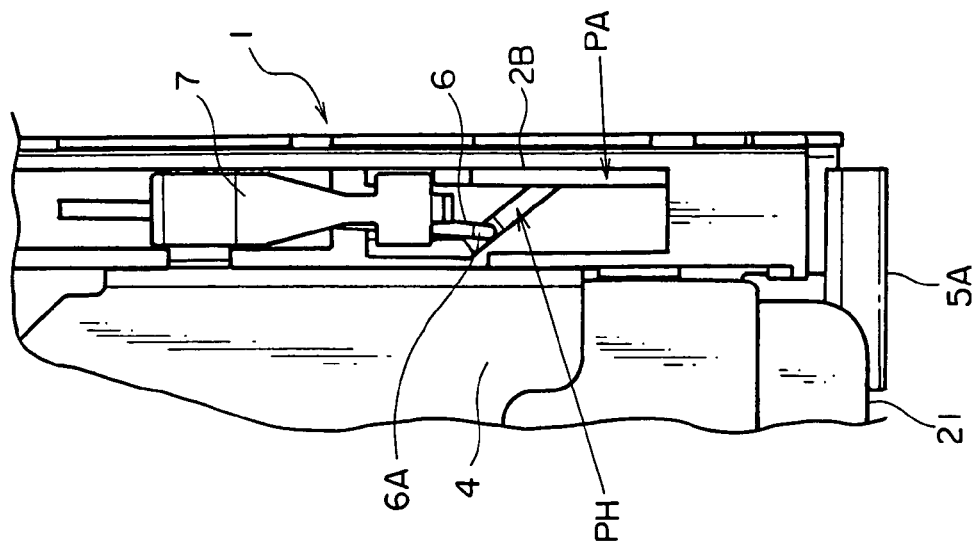
FIG. 19C
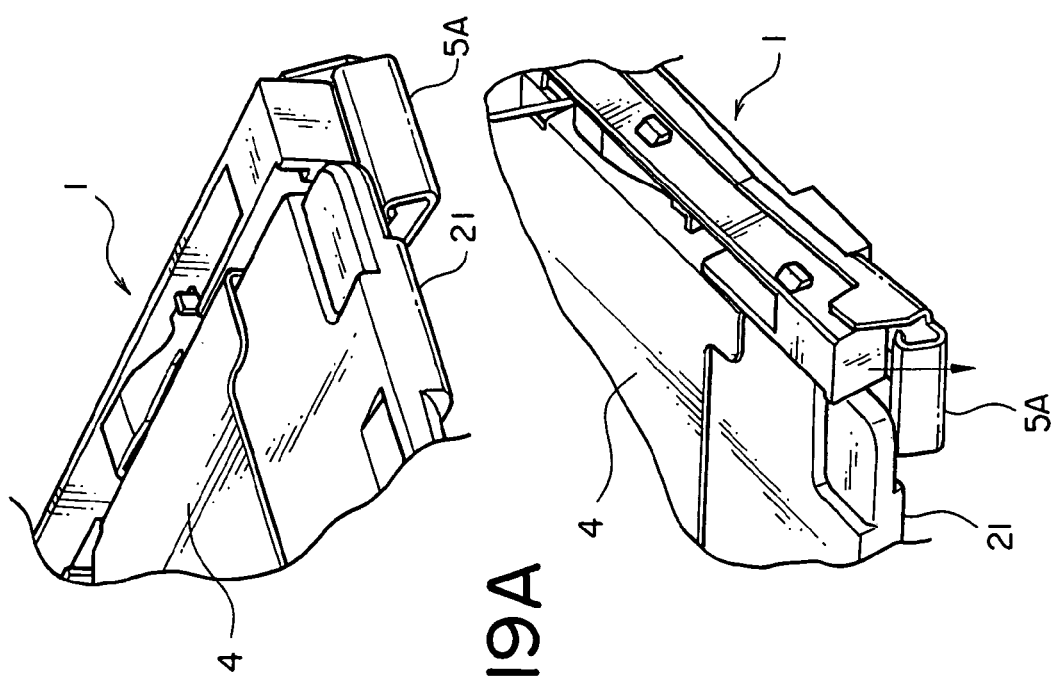
FIG. 19A
FIG. 19B

CARD CONNECTOR

This application claims priority to prior Japanese patent application JP 2004-192627, the disclosure of which is incorporated herein by reference.

BACKGROUND OF THE INVENTION

The present invention relates to a card connector and, in particular, to a card connector having an ejecting mechanism for ejecting a card and a locking mechanism for locking the card to inhibit ejection of the card.

As a first conventional technique, a push-push type card connector (hereinafter simply referred to as "connector") will be described with reference to FIGS. 1 to 4. This connector is disclosed in Japanese Unexamined Patent Application Publication (JP-A) No. 2001-267013.

The connector depicted at 41 in the figures comprises an insulator 42, a plurality of contacts 43 fixed to the insulator 42, an ejecting bar 44 mounted on a frame portion 42A of the insulator 42, a compression coil spring 45, and a cam follower 46. A card 51 is inserted into the connector 41 in an inserting direction and is ejected from the connector 41 in an ejecting direction opposite to the inserting direction. The compression coil spring 45 serves to continuously bias the ejecting bar 44 in the ejecting direction. The cam follower 46 is guided by a heart cam 44C formed on the ejecting bar 44.

More specifically, the insulator 42 is made of a synthetic resin and has a generally rectangular shape with frame portions 42A, 42B, and 42C formed on its three sides. Each of the contacts 43 has a convex contact portion 43A formed at its one end and a flat contact portion 43B formed at the other end. The ejecting bar 44 is made of a synthetic resin and has a generally L shape with a guide portion 44A and a right-angle bent portion 44B. The heart cam 44C is formed on one surface of the guide portion 44A. The bent portion 44B has a card butting portion 44D. When the card 51 is inserted into the connector 41, a forward end of the card 51 is butted against the card butting portion 44D. The guide portion 44A of the ejecting bar 44 is slidably received in a groove (not shown) formed in the frame portion 42A and having a U-shaped section. The compression coil spring 45 is inserted into a groove 44E formed on the one surface of the guide portion 44A. The compression coil spring 45 has one end press-contacted with the ejecting bar 44 and the other end press-contacted with an inner surface of the frame portion 42C. Hence, the ejecting bar 44 is continuously biased by the compression coil spring 45 in the ejecting direction. The cam follower 46 is made of metal and has a lever-like shape. The cam follower 46 is disposed in a cutout 42D formed outside the frame portion 42A to be rotatable by a predetermined angle. A hole 46A is formed at a base of the cam follower 46 and fitted over a shaft 42E formed on the frame portion 42A. Further, a guide pin 46B formed at an end of the cam follower 46 by bending passes through a hole (not shown) formed in the frame portion 42A to be engaged with a cam groove of the heart cam 44C.

The connector 41 is entirely covered with a rectangular cover (not shown).

Referring to FIG. 4, the heart cam 44C of the ejecting bar 44 will be described in detail. The heart cam 44C is formed on the one surface of the guide portion 44A of the ejecting bar 44. The heart cam 44C is formed as a circulating guide rail (cam groove) including a start point C-1 of movement of the guide pin 46B of the cam follower 46, a guide portion C-2 inclined with respect to a sliding direction of the ejecting bar 44, a heart-shaped recessed portion C-3, a guide portion C-4 parallel to the sliding direction of the ejecting bar 44, and an end point C-5 of movement of the guide pin 46B, that is, the start point C-1. In a free state, the guide pin 46B is biased downward in FIG. 4 by elasticity of the cam follower 46.

Referring to FIGS. 3A to 3E and 4, operations of inserting (fitting) and ejecting (removing) the card 51 into and from the connector 41 will be described.

At first, FIG. 3A shows the free state where a part of the card 51 is inserted into the connector 41. At this time, in FIG. 4, the guide pin 46B of the cam follower 46 is located at the start point C-1 of the heart cam 44C.

Next, in FIG. 3B, when the card 51 is pushed into the connector 41, the forward end of the card 51 is butted against the card butting portion 44D of the ejecting bar 44. As a consequence, the card 51 and the ejecting bar 44 slide together into the connector 41 against a compressive force of the compression coil spring 45. In this state, in FIG. 4, the guide pin 46B in the heart cam 44C is located at the guide portion C-2 inclined with respect to the sliding direction of the ejecting bar 44.

Next, the card 51 is pushed to a maximum stroke and thereafter pushing of the card 51 is stopped. Then, the card 51 and the ejecting bar 44 are slightly returned by a restoring force of the compression coil spring 45 to reach a fitting state shown in FIG. 3C. In the fitting state in FIG. 3C, a plurality of pads (not shown) of the card 51 are brought into contact with the convex contact portions 43A of the contacts 43. In this state, in FIG. 4, the guide pin 46B enters into and located in the heart-shaped recessed portion C-3 of the heart cam 44C. In this manner, the operation of fitting the card 51 is completed.

The card 51 is again pushed to the maximum stroke and thereafter pushing of the card 51 is stopped. Then, in FIG. 4, the guide pin 46B escapes from the heart-shaped recessed portion C-3 of the heart cam 44C, passes the guide portion C-4 parallel to the sliding direction of the ejecting bar 44, and reaches the end point C-5, that is, the start point C-1. Under the restoring force of the compression coil spring 45, the card 51 and the ejecting bar 44 pass the state shown in FIG. 3D and reach the state shown in FIG. 3E. In this manner, the operation of ejecting the card 51 is completed.

In the first conventional technique described above, the heart cam 44C is formed on the ejecting bar 44 and the cam follower 46 is formed on the insulator 42. However, the above-mentioned structure may be modified in such a manner that the heart cam is formed on the insulator and the cam follower is formed on the ejecting bar.

Referring to FIGS. 5 through 10, a card connector having a half locking mechanism and a full locking mechanism will be described as a second conventional technique. The card connector of the type is disclosed, for example, in Japanese Unexamined Patent Application Publication (JP-A) No. 11-149956.

In FIGS. 5 and 6, a body 61 has a head portion 71 and a pair of arm portions 72 and 73 extending backward from opposite ends of the head portion 71. A space surrounded by the head portion 71 and the arm portions 72 and 73 is defined as a card set space 74. A plurality of contacts (not shown) are arranged in the head portion 71 in parallel to one another at predetermined intervals. Further, a plurality of terminals 75 connected to the respective contacts protrude on a front side of the head portion 71. The arm portions 72 and 73 are provided with guide grooves 76 and 77 extending long in extending directions thereof. The guide grooves 76 and 77 serve to guide opposite lateral ends of a card 100 so that the card 100 is inserted into the card set space 74 or removed from the card set space 74. In a state where the card 100 is inserted into the card set space 74, the contacts are brought into elastic contact with an external electrode (not shown) equipped in the card 100 to achieve electrical connection.

In the body 61, one arm portion 73 has a groove 78 extending obliquely across the arm portion 73. Wall surfaces of the groove 78 serve as guide surfaces 79 for guiding a slider 64 which will later be described. The guide surfaces 79 are inclined to be closer to a center line L—L of the card set space 74 in a forward direction A.

A movable member 63 comprising a metal cover is arranged across the arm portions 72 and 73 on both sides of the body 61. The movable member 63 has a top plate portion 91 and side plate portions 92, 92 connected to both lateral ends of the top plate portion 91 and is held by the body 61 to be slidable in a back-and-forth direction X (to be movable backward and forward).

As will be understood from FIGS. 5, 6, and 8 in combination, the top plate portion 91 of the movable member 63 is provided with cut and bent portions formed on both sides thereof and protruding inward in the card set space 94. The cut and bent portions serve as engaging portions 93, 93.

Further, as will be understood from FIGS. 5, 6, and 9 in combination, the top plate portion 91 is provided with a cut and bent portion formed at the center thereof and protruding outward. The cut and bent portion serves as a connecting portion 94 for cooperation with a locking member which will later be described. The top plate portion 91 further has an elongated engaging hole 95. The engaging hole 95 is one example of a guiding portion.

In FIGS. 5 to 7, the slider 64 is fitted in the groove 78 of the body 61 and is guided inward and outward along the guide surfaces 79. The slider 64 is provided with an engaging portion 101 formed at an inner end thereof. Further, the slider 64 is provided with a protrusion 102 protruding upward. The protrusion 102 is one example of a guided portion to be guided and may be integrally formed together with the slider 64 by the use of synthetic resin. Alternatively, as shown in FIG. 7, a pin 104 having a flange 103 may be formed on the slider 64 to protrude therefrom.

As shown in FIGS. 5 and 6, the protrusion 102 of the slider 64 fitted in the groove 78 is engaged with the engaging hole 95 of the movable member 63. When the movable member 63 moves in the forward direction A, the protrusion 102 engaged with the engaging hole 95 is pulled by the movable member 63 in the forward direction A. Consequently, the slider 64 is moved inward along the guide surfaces 79 as shown by an arrow E in FIG. 6. In a state where the movable member 63 reaches an advanced position, the engaging portion 101 of the slider 64 protrudes inward from the arm portion 73 into the card set space 74. On the other hand, when the movable member 63 is retracted from the advanced position, the protrusion 102 engaged with the engaging hole 95 is pulled by the movable member 63 in a backward direction B. Consequently, the slider 64 is moved outward along the guide surfaces 79 and the engaging portion 101 of the slider 64 is retracted from the card set space 74.

As shown in FIGS. 5 and 6, a recess H is formed at a lateral side of the card 100. As shown in FIG. 10, the recess H may be formed by denting a part of the card 100 throughout an entire thickness.

In the card connector mentioned above, in an initial state where the card 100 is not inserted into the card set space 74, the movable member 63 is located at a retracted position and the engaging portion 101 of the slider 64 is retracted outside the card set space 74, as shown in FIG. 5.

When the card 100 is put into the guide grooves 76 and 77 from the initial state and inserted into the card set space 74, the card 100 is guided by the guide grooves 76 and 77. During insertion of the card 100 into the card set space 74 in this manner, a forward end F of the card 100 is engaged with the engaging portion 93 as shown in FIG. 5 and the movable member 63 is pushed by the card 100 in the forward direction A to move forward. When the movable member 63 is moved forward in this manner, the slider 64 is pulled forward together with the protrusion 102 engaged with the engaging hole 95 of the movable member 63. As a result, the slider 64 is moved inward along the guide surfaces 79. Then, when the movable member 63 reaches the advanced position, i.e., when the card 100 reaches the card set space 74, the engaging portion 101 formed on the slider 64 protrudes into the card set space 74 to be fitted in the recess H of the card 100. Consequently, the card 100 is locked at that position. At this time, the card 100 is locked in a half-locked state. In the half-locked state, when the card 100 inserted into the card set space 74 is pulled in a retracting direction (in the backward direction B) by a small pull-out force, the engaging portion 101 is kept fitted in the recess H of the card 100 to prevent the card 100 from being pulled out. However, when the pull-out force is larger than a certain value, the pull-out force is transmitted to the slider 64 via engagement between the engaging portion 101 and the recess H of the card 100. Therefore, the slider 64 is moved outward along the guide surfaces 79. Consequently, the engaging portion 101 of the slider 64 is removed from the recess H of the card 100 and retracted from the card set space 74 to cancel the state where the card 100 is prevented by the engaging portion 101 from being pulled out. Therefore, the card 100 is pulled out and ejected. Following the outward movement of the slider 64, the movable member 63 is retracted.

The above-mentioned card connector by itself has only a half-locking function. However, since the top plate portion 91 of the movable member 63 has the connecting portion 94 formed by cutting and bending to protrude outward, it is easily possible to provide the card connector with a full-locking function by utilizing the connecting portion 94.

The card connector of the first conventional technique is disadvantageous in that, when the compression coil spring 45 presses the ejecting bar 44 upon ejecting the card 51, the card 51 often jumps out from the ejecting bar 44.

In the card connector of the second conventional technique, in the half-locked state, the card is ejected if the card is pulled by a large force. In the full-locked state, the card is not ejected even if the card is pulled by a large force. However, an operation of setting the connector into the full-locking state is troublesome and the mechanism is complicated and requires an increased number of parts.

SUMMARY OF THE INVENTION

It is an object of the present invention is to provide a card connector which is capable of preventing a card from being erroneously ejected due to vibration, mechanical shock, drop, and the like, which is easy in inserting and ejecting operations of the card, and which has a simple mechanism with a small number of parts.

A card connector according to the present invention has a card inserting/ejecting opening through which a card having at least one card contact is inserted or ejected in an inserting direction and an ejecting direction, an ejecting mechanism for ejecting the card, a locking mechanism for locking the card to inhibit ejection of the card, and at least one contact to be connected to the at least one card contact.

According to an aspect of the present invention, the ejecting mechanism has an ejecting slider slidable in the inserting and the ejecting directions together with the card. The ejecting slider has an operating part. The locking mechanism has an operated part elastically deformable and a locking portion combined with the operated part. The locking portion is movable between an open position and a closed position of the card inserting/ejecting opening. The ejecting mechanism and the locking mechanism are formed so that, when the card is inserted, the ejecting slider slides in the inserting direction together with the card to separate the operating part from the operated part, thereby deforming the operated part in one direction to move the locking portion from the open position to the closed position.

In the card connector according to the aspect of the present invention, the ejecting mechanism and the locking mechanism are further formed so that, when the card is ejected by operating the ejecting mechanism, the operating part deforms the operated part in a direction opposite to the one direction to move the locking portion from the closed position to the open position.

It is desirable that the card connector further comprises an insulator for holding the ejecting slider so that the ejecting slider is slidable. In this case, the ejecting mechanism further has a heart cam portion formed in the insulator and a cam follower connected to the ejecting slider and engaged with the heart cam portion. The ejecting slider is provided with an auxiliary spring continuously pressing the cam follower towards the heart cam portion.

In the card connector, it is desirable that the ejecting slider has the operating parts on its both sides. In this case, the locking mechanism is arranged on both sides of the insulator in correspondence to the operating parts.

In the card connector, it is desirable that the operating part is a press-down piece comprising a part of the ejecting slider. In this case, the locking mechanism has, as the operated part, a lock press-down portion pressed down by the press-down piece and the locking portion is integral with the lock press-down portion.

BRIEF DESCRIPTION OF THE DRAWINGS

FIGS. 3A to 3E are perspective views showing a sequence of steps of inserting and ejecting the card into and from the card connector shown in FIG. 1;

FIGS. 14A to 14C are views showing a state before a card is inserted into the card connector shown in FIG. 11, FIG. 14A being a perspective view of a part of the card connector as seen from a front side, FIG. 14B being a perspective view of a part of the card connector as seen from a lateral side, FIG. 14C being a plan view of a part of the card connector;

FIGS. 15A to 15C are views showing a state where the card is inserted into the card connector shown in FIG. 11, FIG. 15A being a perspective view of a part of the card connector as seen from the front side, FIG. 15B being a perspective view of a part of the card connector as seen from the lateral side, FIG. 15C being a plan view of a part of the card connector;

FIGS. 16A to 16C are views showing a state where the card is inserted into an innermost position of the card connector shown in FIG. 11, FIG. 16A being a perspective view of a part of the card connector as seen from the front side, FIG. 16B being a perspective view of a part of the card connector as seen from the lateral side, FIG. 16C being a plan view of a part of the card connector;

FIGS. 17A to 17C are views showing a state where the card is fitted in the card connector shown in FIG. 11, FIG. 17A being a perspective view of a part of the card connector as seen from the front side, FIG. 17B being a perspective view of a part of the card connector as seen from the lateral side, FIG. 17C being a plan view of a part of the card connector;

FIGS. 18A to 18C are views showing a state where a card is inserted into the innermost position of the card connector shown in FIG. 11 in order to eject the card from the card connector, FIG. 18A being a perspective view of a part of the card connector as seen from the front side, FIG. 18B being a perspective view of a part of the card connector as seen from the lateral side, FIG. 18C being a plan view of a part of the card connector; and FIGS. 19A to 19C are views showing a state immediately before completion of ejection of the card from the card connector, FIG. 19A being a perspective view of a part of the card connector as seen from the front side, FIG. 19B being a perspective view of a part of the card connector as seen from the lateral side, FIG. 19C being a plan view of a part of the card connector.

DESCRIPTION OF THE PREFERRED EMBODIMENT

Referring to FIGS. 11 to 19, a card connector according to a preferred embodiment of the present invention will be described. In the following, similar parts to those of the first conventional technique will not be described any longer and different parts alone will be described.

Figure 11:
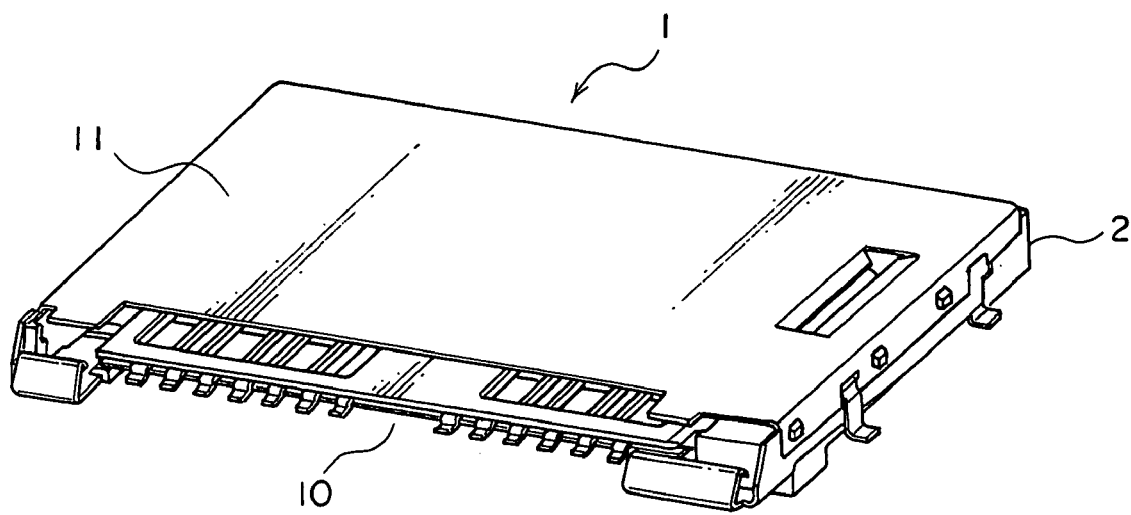
FIG. 11 is a perspective view of a card connector according to an embodiment of the present invention.

Referring to FIG. 11, a card connector (hereinafter may simply be referred to as a "connector") 1 according to one embodiment of the present invention comprises a frame-like insulator 2. In the connector 1, various parts (which will later be described) disposed on the insulator 2 are covered with a cover frame 11. The connector 1 is provided with a card inserting/ejecting opening 10 formed on a front side thereof.

Figure 1:
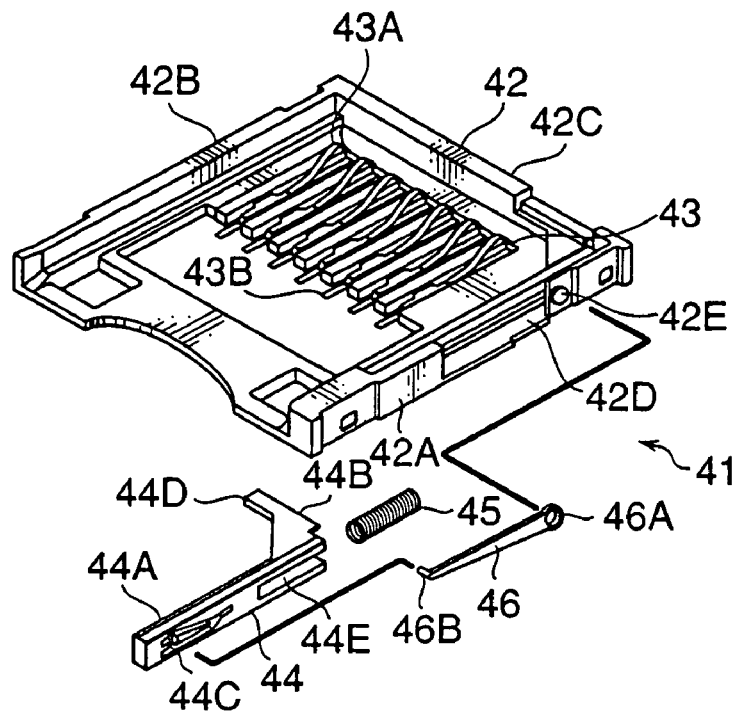
FIG. 1 is an exploded perspective view of a push-push type card connector according to a first conventional technique.
Figure 2:
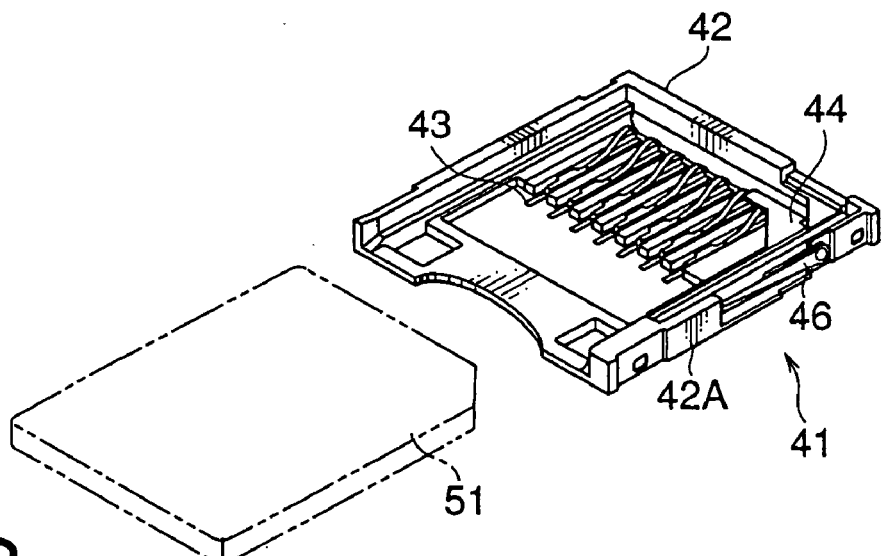
FIG. 2 is a perspective view showing a state before a card is inserted into the card connector shown in FIG. 1.
Figure 4:
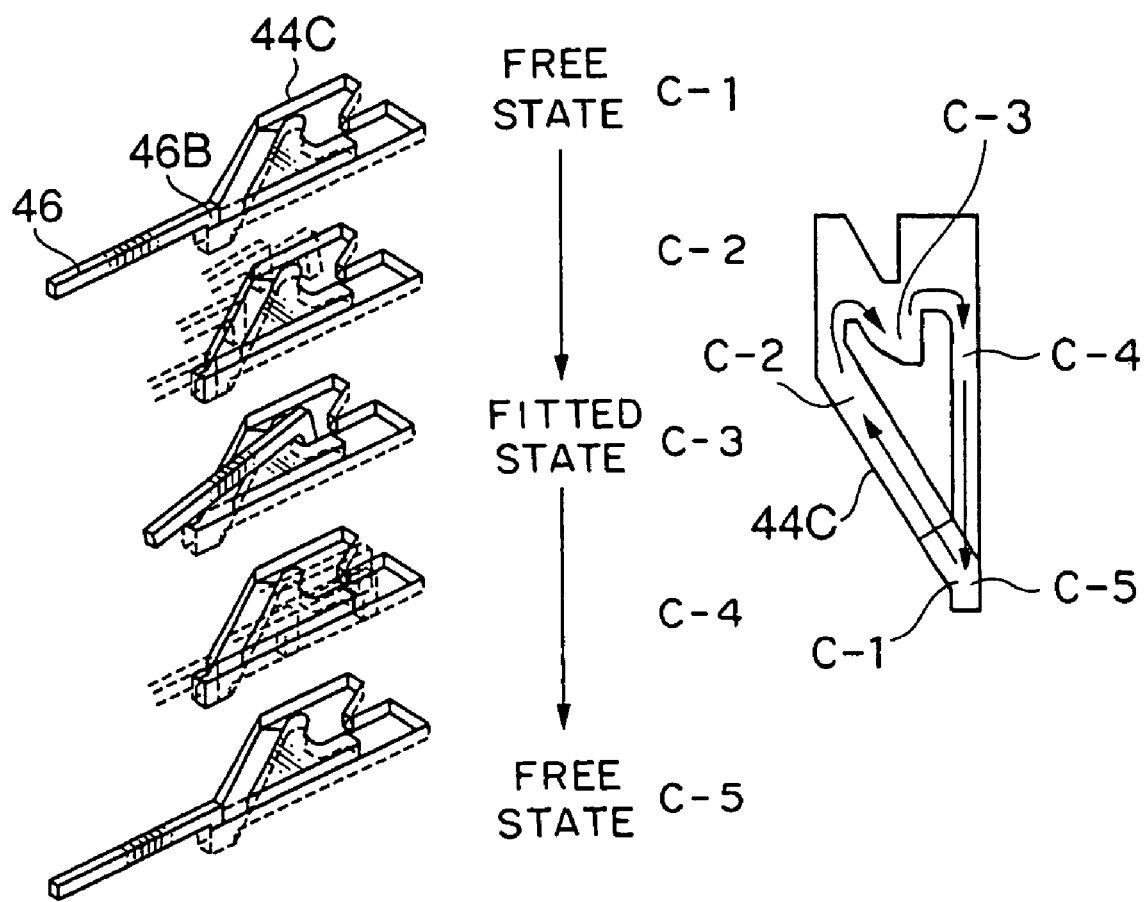
FIG. 4 is a perspective view for describing the movement of a guide pin of a cam follower guided by a cam groove of a heart cam in the card connector shown in FIG. 1.
Figure 5:
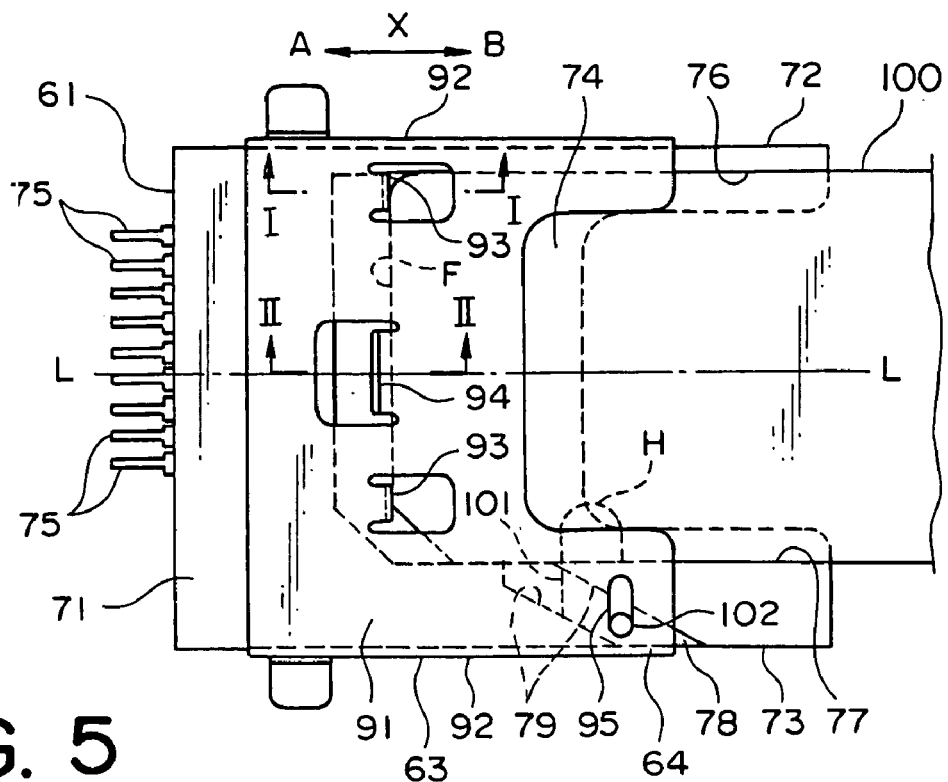
FIG. 5 is a plan view of a card connector according to a second conventional technique in a state where a card is being inserted.
Figure 6:
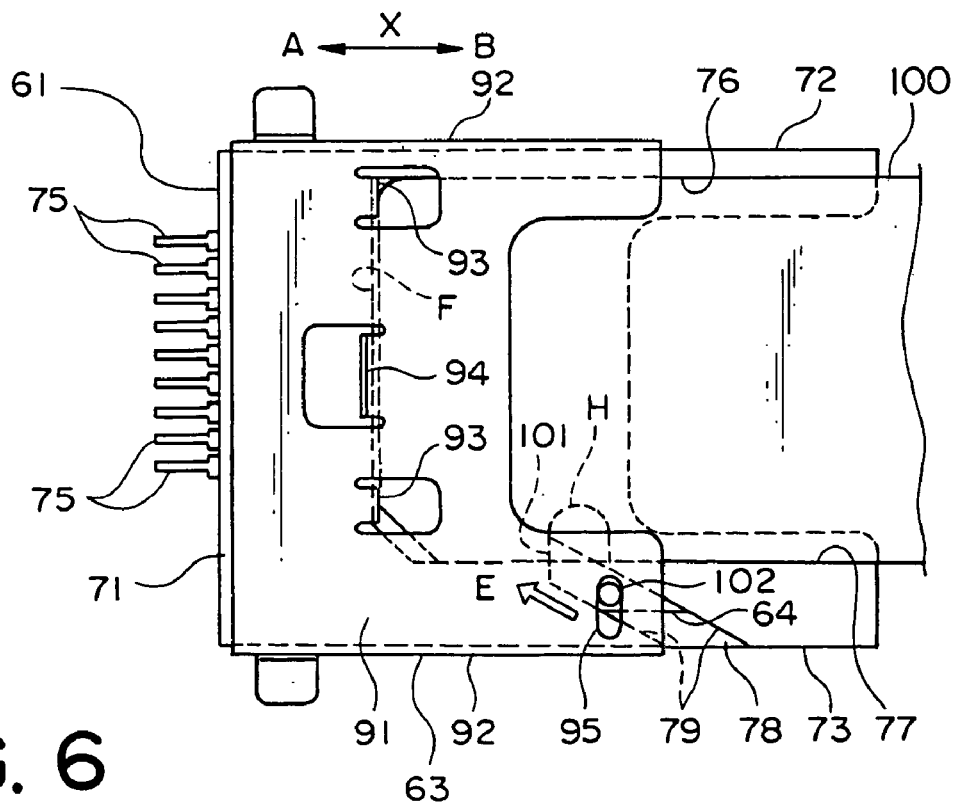
FIG. 6 is a plan view of the card connector shown in FIG. 5 in a state where the card is half locked.
Figure 7:
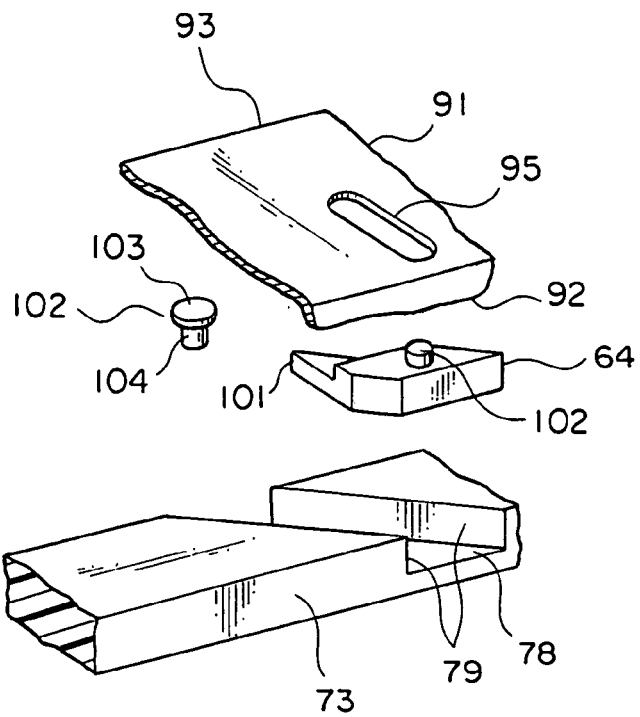
FIG. 7 is an exploded perspective view of a characteristic part of the card connector shown in FIG. 5.
Figure 8:
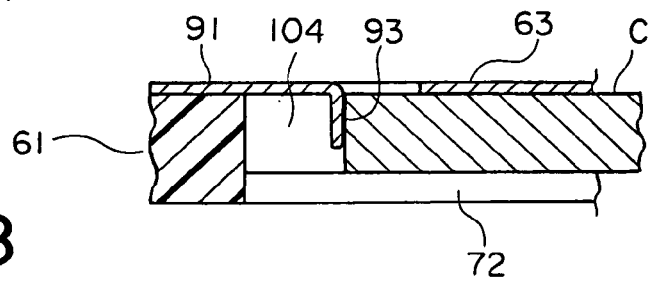
FIG. 8 is an enlarged sectional view taken along a line I—I in FIG. 5.
Figure 9:
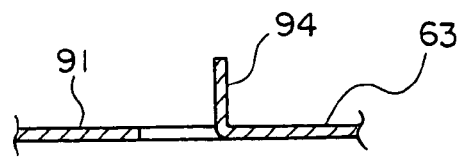
FIG. 9 is an enlarged sectional view taken along a line II—II in FIG. 5.
Figure 10:
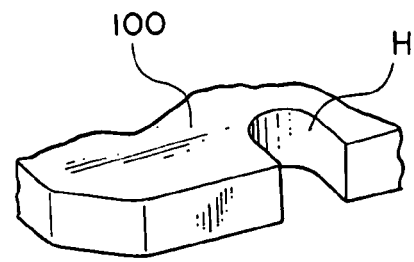
FIG. 10 is an enlarged sectional view showing the shape of a recess formed in the card used in the second conventional technique.
Figure 12:
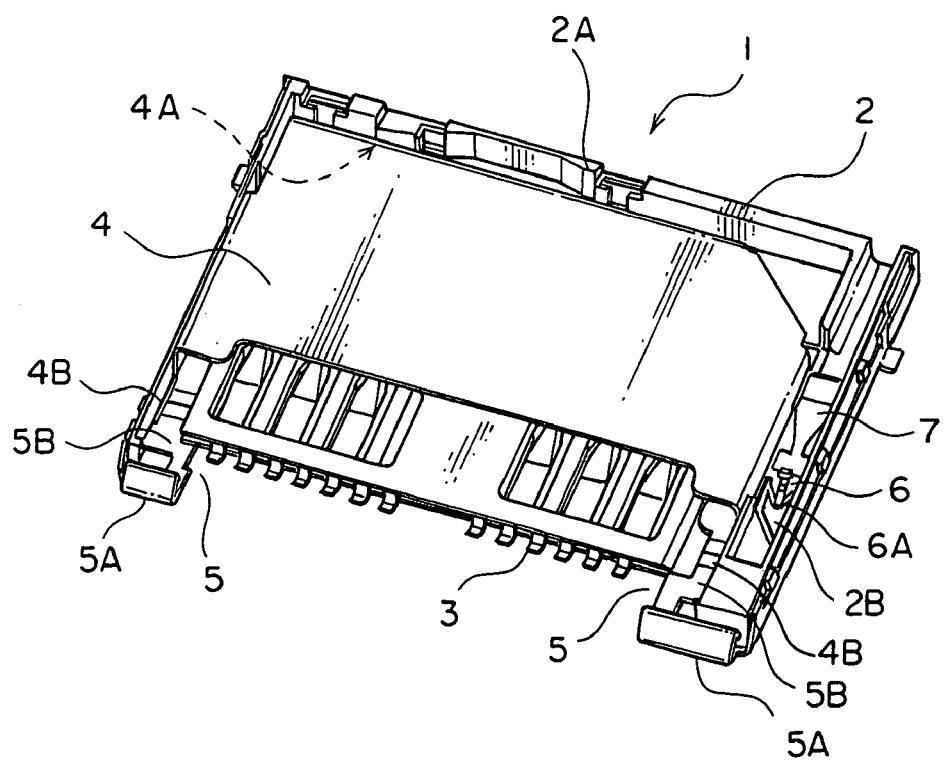
FIG. 12 is a perspective view showing the card connector shown in FIG. 11 in a state where a cover frame is removed therefrom.

Referring to FIG. 12, the cover frame 11 is removed from the connector 1 shown in FIG. 11. A number of contacts 3 are arranged in a single line on a front side of the insulator 2. An ejecting slider 4 is held above the contacts 3 to be slidable between a front position and an inner position of the insulator 2. An ejecting slider receiving surface 2A is formed at the inner position of the insulator 2 so that a forward end portion of the ejecting slider 4 is butted against the receiving surface 2A. A card receiving surface 4A is formed downward at the forward end portion of the ejecting slider 4. A compression coil spring (not shown) similar to the compression coil spring 45 described in conjunction with FIG. 1 is interposed between the insulator 2 and ejecting slider 4. The ejecting slider 4 is biased by the compression coil spring in an ejecting direction in which a card is ejected, i.e., toward the front side of the connector 1.

On the front side of the insulator 2, a pair of locking members 5 are formed on both sides, respectively. Each of the locking members 5 comprises a locking portion 5A and an elastically deformable lock press-down portion 5B integrally formed with the locking portion 5A. On a front side of the ejecting slider 4, a pair of press-down pieces 4B are formed on both sides, respectively. The press-down pieces 4B serve to press down the lock press-down portions 5B. Each of the press-down pieces 4B may be formed by a part of the ejecting slider 4 or may be formed as a separate part and fixed to the ejecting slider 4.

On one of the both sides of the insulator 2 (right side in FIG. 12), a heart cam portion 2B is formed. One end (not shown) of a cam follower 6 is fixed to the ejecting slider 4. The other end 6A of the cam follower 6 is pressed by an auxiliary leaf spring 7 fixed to the ejecting slider 4 to be continuously engaged with a groove 2B1 (see FIG. 13) of the heart cam portion 2B.

Figure 13A:
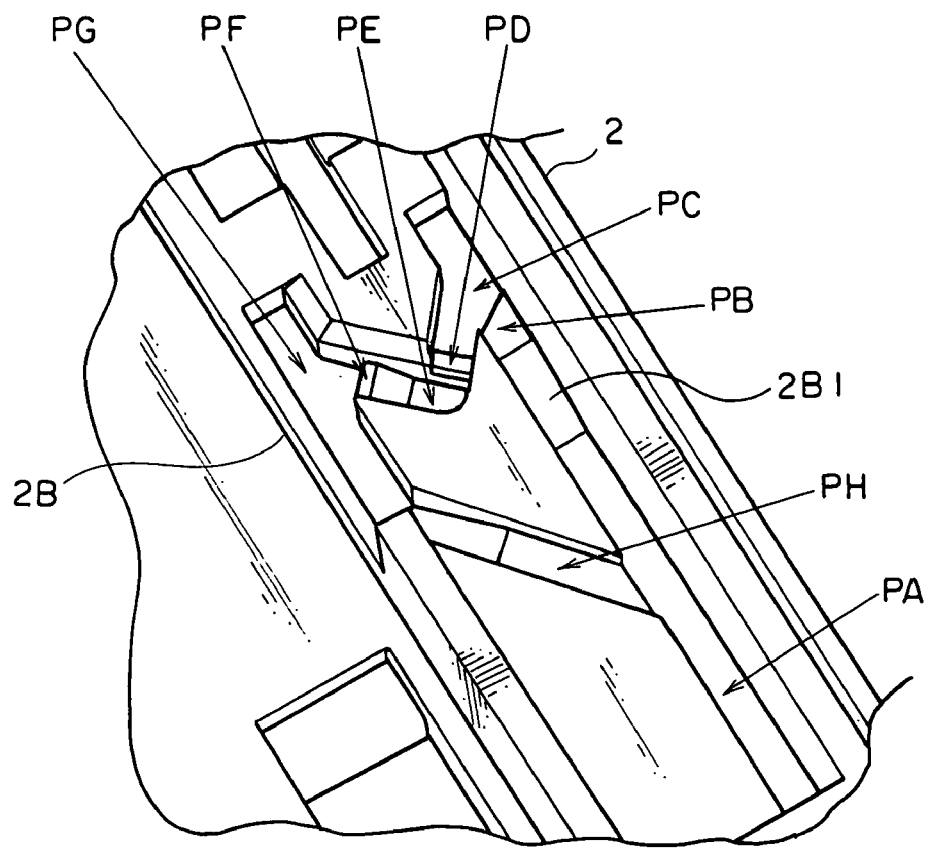
FIG. 13A is a perspective view of a heart cam portion formed in an insulator of the card connector shown in FIG. 11.
Figure 13B:
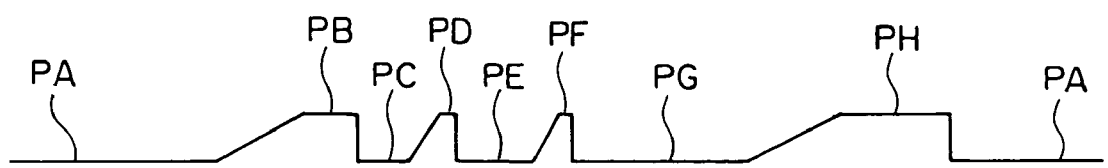
FIG. 13B is a profile chart showing a change in depth of a groove in the heart cam portion shown in FIG. 11.

Referring to FIG. 13A, the heart cam portion 2B has the groove 2B1 of a heart-like shape starting from a position PA, extending via positions PB, PC, PD, PE, PF, PG, PH, and returning to the position PA. The groove 2B1 has a bottom wall provided with slopes and steps. For reference, a change in depth of the groove 2B1 from the position PA, via the positions PB, . . . , PH, to the position PA is shown by a profile chart in FIG. 13B.

Referring to FIGS. 14A to 14C, the card 21 is not yet inserted into the connector 1. In the state shown in FIGS. 14A to 14c, the ejecting slider 4 is placed on the front side of the connector 1 under a restoring force of the compression coil spring. In this state, the press-down portions 4B of the ejecting slider 4 press down the lock press-down portions 5B of the locking members 5, respectively, to elastically deform the lock press-down portions 5B so that the locking portions 5A are also moved downward. Accordingly, the card inserting/ejecting opening 10 of the connector 1 is opened.

Referring to FIGS. 15A to 15C, description will be made of a state ST1 where the card 21 is inserted into the connector 1 by fingers. FIGS. 15A to 15C show parts substantially similar to those illustrated in FIGS. 14A to 14C, respectively. This also applies to FIGS. 16A to 16C, FIGS. 17A to 17C, FIGS. 18A to 18C, and FIGS. 19A to 19C which will later be described. When the card 21 is inserted into the connector 1, the forward end of the card 21 is butted against the card receiving surface 4A of the ejecting slider 4. At this time, the other end 6A of the cam follower 6 is located at the position PA in the groove 2B1 of the heart cam portion 2B. The other end 6A of the cam follower 6 is applied with a biasing force so as to continuously press the bottom wall of the groove 2B1 even when the cam follower 6 moves to any position in the groove 2B1.

Referring to FIGS. 16A to 16C, description will be made of a state ST2 where the card 21 is further inserted inward so that the card 21 and the ejecting slider 4 are moved to the innermost position of the connector 1. In this state, the forward end portion of the ejecting slider 4 is butted against the ejecting slider receiving surface 2A of the insulator 2.

In this state, the press-down pieces 4B of the ejecting slider 4 are separated from the lock press-down portions 5B of the locking members 5 so that the locking portions 5A are moved upward. As a result, the card inserting/ejecting opening 10 is closed by the two locking portions 5A and the connector 1 is brought into a card locking state. At this time, the other end 6A of the cam follower 6 moves from the position PA, climbs up the slope to reach the position PB, and then descends over the step down to the position PC lower than the position PB.

Referring to FIGS. 17A to 17C, description will be made of a state ST3 where the card 21 is fitted to the connector 1. When the fingers are released from the card 21 in this state, the ejecting slider 4 is slightly moved together with the card 21 under the restoring force of the compression spring (not shown) in the ejecting direction of the card 21. At this time, the other end 6A of the cam follower 6 moves from the position PC, climbs up the slope to reach the position PD, and then descends over the step down to the position PE lower than the position PD. This is because, from the position PC to the position PE, the groove 2B1 is formed to be slightly closer to the position PA. With this structure, the cam follower 6 is restrained by the heart cam portion 2B. Since the one end of the cam follower 6 is fixed to the ejecting slider 4, the ejecting slider 4 slightly moving in the ejecting direction of the card 21 is restrained together with the card 21. The two locking portions 5A are kept in the card locking state (closed state). In this state, the contacts 3 of the connector 1 are brought into contact with a plurality of card contacts (not shown) of the card 21, respectively.

Referring to FIGS. 18A to 18C, description will be made of a state ST4 where the card 21 is again pushed by fingers in the state where the ejecting slider 4 is restrained. When the card 21 is pushed, the forward end portion of the ejecting slider 4 is again butted against the ejecting slider receiving surface 2A. Then, the other end 6A of the cam follower 6 moves from the position PE, climbs up the slope to reach the position PF, and descends over the step down to the position PG. This is because, from the position PE to the position PG, the groove 2B1 the groove 2B1 is formed to be slightly away from the position PA. After the position PG is reached, the groove 2B1 does not have a portion where the other end 6A of the cam follower 6 is caught. Therefore, the other end 6A of the cam follower 6 reaches the position PH via the state shown in FIGS. 19A to 19C, climbs up the slope, and descends over the step down to the position PA. Thus, the connector 1 returns to the state ST1.

In the process where the card 21 returns to the state ST1, the two press-down pieces 4B of the ejecting slider 4 elastically deform the lock press-down portions 5B of the locking members 5 downward, respectively. As a consequence, the two locking portions 5A are also moved downward to open the card inserting/ejecting opening 10. Accordingly, the card 21 can be taken out from the connector 1.

It is noted here that, an "ejecting mechanism" mentioned in appended claims corresponds to a combination of the ejecting slider 4, the heart cam portion 2B, and the cam follower 6 in the foregoing embodiment. A "locking mechanism" corresponds to the locking member 5 having the locking portion 5A and the lock press-down portion 5B. An "operating part" corresponds to the press-down piece 4B of the ejecting slider 4. An "operated part" corresponds to the lock press-down portion 5B of the locking member 5.

As is clear from the foregoing description, the present invention exhibits the following effects.

1. In the state where the card is inserted in the connector, the locking portions are positioned so that the card inserting/ejecting opening is closed. It is therefore possible to prevent the card from being erroneously ejected due to vibration, shock, drop, etc.

2. The card can be inserted or ejected only by operating the ejecting mechanism. Therefore, the inserting of the ejecting operation is easy.

3. The card inserting/ejecting opening is opened or closed by the operating part of the ejecting slider of the ejecting mechanism and the locking portion and the operated part of the locking mechanism. Therefore, the connector is simple in structure with a reduced number of parts, easy in assembling and disassembling, and low in cost.

While the present invention has thus far been described in connection with the preferred embodiment thereof, it will readily be possible for those skilled in the art to put this invention into practice in various other manners.

What is claimed is:

1. A card connector comprising:
    a card inserting/ejecting opening through which a card having at least one card contact is inserted or ejected in an inserting direction and an ejecting direction, respectively;
    an ejecting mechanism which is operable to eject the card, and which includes an ejecting slider that is slidable in the inserting and ejecting directions together with the card and has a plurality of operating parts;
    a locking mechanism which is operable to lock the card to inhibit ejection of the card, and which includes an operated part that is elastically deformable and a locking portion that is combined with the operated part and is movable between an open position and a closed position with respect to the card inserting/ejecting opening; and
    at least one contact to be connected to the at least one card contact;
    wherein the ejecting mechanism and the locking mechanism are formed so that, when the card is inserted, the ejecting slider slides in the inserting direction together with the card to separate the operating parts of the ejecting slider from the operated part of the locking mechanism, thereby deforming the operated part in one direction to move the locking portion from the open position to the closed position;
    wherein the card connector further comprises an insulator for holding the ejecting slider so that the ejecting slider is slidable, and the ejecting mechanism further comprises a heart cam portion formed in the insulator and a cam follower connected to the ejecting slider and engaged with the heart cam portion, and the ejecting slider is provided with an auxiliary spring that continuously presses the cam follower towards the heart cam portion; and
    wherein the ejecting slider has the operating parts on respective sides thereof, and the locking mechanism is arranged on both sides of the insulator in correspondence to the operating parts.

2. The card connector as claimed in claim 1, wherein the operating parts are press-down pieces comprising parts of the ejecting slider; and
    wherein the locking mechanism has, as the operated part, a lock press-down portion pressed down by the press-down pieces, and the locking portion is integral with the lock press-down portion.

3. The card connector as claimed in claim 1, wherein the ejecting mechanism and the locking mechanism are formed so that, when the card is ejected by operating the ejecting mechanism, the operating parts deform the operated part in a direction opposite to the one direction, so as to move the locking portion from the closed position to the open position.

4. The card connector as claimed in claim 3, wherein the operating parts are press-down pieces comprising parts of the ejecting slider; and
    wherein the locking mechanism has, as the operated part, a lock press-down portion pressed down by the press-down pieces, and the locking portion is integral with the lock press-down portion.

* * * * *

UNITED STATES PATENT AND TRADEMARK OFFICE
CERTIFICATE OF CORRECTION

| | |
|---|---|
| PATENT NO. | : 7,131,853 B2 |
| APPLICATION NO. | : 11/121716 |
| DATED | : November 7, 2006 |
| INVENTOR(S) | : Joe Motojima |

Page 1 of 1

It is certified that error appears in the above-identified patent and that said Letters Patent is hereby corrected as shown below:

On the Title page, after item (65) Prior Publication Data;

insert --(30) Foreign Application Priority Data

Jun. 30, 2004 (JP)............ 2004-192627--

Signed and Sealed this

Twenty-ninth Day of July, 2008

JON W. DUDAS
*Director of the United States Patent and Trademark Office*